Patented Feb. 20, 1940

2,190,732

UNITED STATES PATENT OFFICE 2,190,732

MANUFACTURE OF DIAMINODIARYLKETONES AND PRODUCT THEREOF

Gustav Reddelien, Leipzig, and Georg Matthaeus, Wolfen, Kreis Bitterfeld, Germany, assignors to General Aniline & Film Corporation, a corporation of Delaware No Drawing. Application July 28, 1937, Serial No. 156,143. In Germany August 26, 1936

4 Claims. (Cl. 260—570)

The process which produces Michler's ketone, namely the reaction of substituted aromatic amines with phosgene is not applicable as a general method.

This invention relates to the manufacture of Michler's ketone and other similar ketones which are accessible only with difficulty, by causing the corresponding hydrols to react with hydrazines of the aromatic series in the presence of a small proportion of acid, then oxidizing the condensation products thus obtained and converting them into ketones by acid scission. The course of the reaction may be supposed to be as follows:

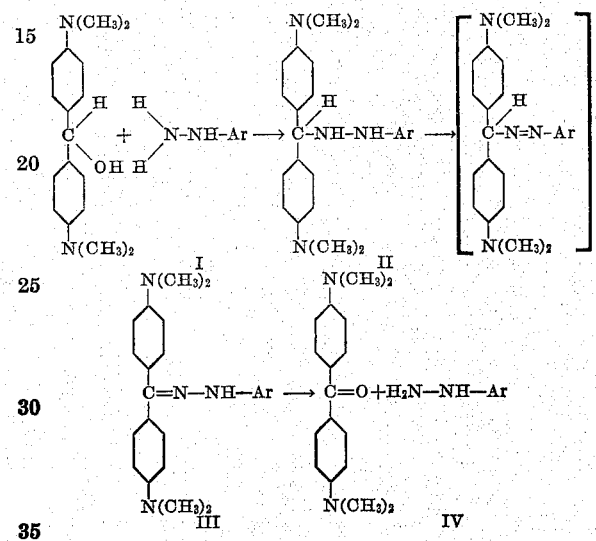

In these formulae Ar is an aromatic radicle, preferably phenyl.

Such ketones are not obtainable by direct oxidation of hydrols. However, the new process produces a good yield by oxidation of the phenylhydrazones of the ketone which by acid scission pass into the ketone.

The following example illustrates the invention, the parts being by weight:

27 parts of tetramethyldiaminobenzhydrol are dissolved in 100 parts of alcohol and the solution is mixed with 10.82 parts of phenylhydrazine. To this mixture is added 0.3 to 0.5 part of 2-N-hydrochloric acid. The condensation product soon separates in the form of crystals, which are filtered after having stood for some hours, washed and dried. The yield of the pure substance, which melts at 119° C., amounts to 82 per cent.

18 parts of the anilidoleucauramine are oxidized in 200 parts of acetone and 10 parts of water with the calculated proportion of potassium permanganate. The manganese oxides produced are separated and extracted with benzene. The filtrates are distilled in steam. When the residue in the retort has cooled, it is boiled with dilute hydrochloric acid. From the cooled solution a precipitate is produced by addition of dilute caustic soda solution; this is phenylhydrazone of the Michler's ketone of melting point 130 to 140° C.; by scission with acid the phenylhydrazone yields the Michler's ketone of melting point 172° C. in a yield of 75 per cent. In a corresponding manner there may be obtained, for example, other para-tetraalkyldiaminobenzophenones which may contain nuclear substituents such as alkyl, halogen, alkoxy and so on. Thus, tetrabutyldiaminobenzophenone is obtainable with a yield of 50 per cent. Furthermore, the tertiary diamines may contain hydroxyalkyl groups in amino groups and symmetrical dihydroxyethyldibutyldiaminobenzophenone may be obtained with a yield of 60 per cent.

Instead of potassium permanganate other oxidizing agents such as hydrogen peroxide, pyrolusite, lead peroxide, chromates or even dehydroindigo may be used.

What we claim is:

1. The process of manufacturing tertiary amino ketones of the benzene series which comprises reacting a hydrol of the general formula

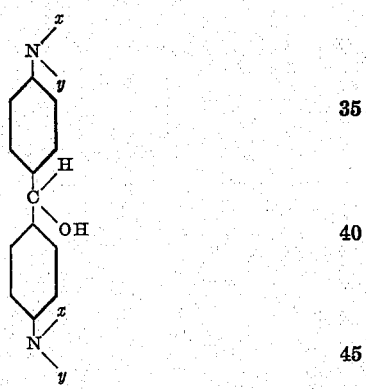

wherein $x$ and $y$ are members of the group consisting of alkyl and hydroxyalkyl with phenylhydrazine in an alcoholic solution in the presence of a catalytic amount of an acid, oxidizing the condensation product thus obtained and subjecting it to acid scission.

2. The process which comprises reacting tetramethyldiaminobenzhydrol with phenylhydrazine in an alcoholic solution in the presence of a catalytic amount of an acid, oxidizing the condensation product thus obtained and subjecting it to acid scission.

3. The process which comprises reacting dihydroxyethyldibutyldiaminobenzhydrol with phenylhydrazine in an alcoholic solution in the presence of a catalytic amount of an acid, oxidizing the condensation product thus obtained and subjecting it to acid scission.

4. Dihydroxyethyldibutyldiaminobenzophenone.

GUSTAV REDDELIEN.
GEORG MATTHAEUS.